United States Patent
Kwon et al.

(10) Patent No.: US 11,074,141 B2
(45) Date of Patent: Jul. 27, 2021

(54) DATABASE RECOVERY USING SHARED MEMORY

(71) Applicant: SAP SE, Walldorf (DE)

(72) Inventors: Yong Sik Kwon, Seoul (KR); Changseob Lee, Seoul (KR); Seyeong Bae, Seoul (KR); Beomsoo Kim, Seoul (KR); Youngho Yoo, Seoul (KR)

(73) Assignee: SAP SE, Walldorf (DE)

( * ) Notice: Subject to any disclaimer, the term of this patent is extended or adjusted under 35 U.S.C. 154(b) by 7 days.

(21) Appl. No.: 16/711,853

(22) Filed: Dec. 12, 2019

(65) Prior Publication Data

US 2021/0182157 A1 Jun. 17, 2021

(51) Int. Cl.
*G06F 11/14* (2006.01)
*G06F 11/10* (2006.01)

(52) U.S. Cl.
CPC ...... *G06F 11/1469* (2013.01); *G06F 11/1004* (2013.01); *G06F 11/1451* (2013.01); *G06F 2201/80* (2013.01); *G06F 2201/82* (2013.01); *G06F 2201/84* (2013.01)

(58) Field of Classification Search
CPC ............. G06F 11/1469; G06F 11/1004; G06F 11/1451; G06F 2201/80; G06F 2201/84; G06F 2201/82
USPC .......................................... 714/19
See application file for complete search history.

(56) References Cited

U.S. PATENT DOCUMENTS 10,970,275 B2 * 4/2021 Geissinger .............. G06F 16/22
2018/0150360 A1 * 5/2018 Kwon ................. G06F 11/2097

* cited by examiner

*Primary Examiner* — Yair Leibovich
(74) *Attorney, Agent, or Firm* — Buckley, Maschoff & Talwalkar LLC (57) ABSTRACT

A system includes initiation of recovery from a crash of a database instance and, during the recovery, identification of a subset of pages of a memory image of the database instance which are not reusable and replacement of the identified subset of pages with corresponding pages of the savepoint image.

17 Claims, 7 Drawing Sheets

FIG. 7

DATABASE RECOVERY USING SHARED MEMORY

BACKGROUND

Traditionally, a database computing system stored database data on a disk or other persistent storage and selectively loaded data into volatile memory (e.g., Random Access Memory) in order to perform operations thereon. A portion of the database data would typically remain in a cache during operation, with changes to the cached data being periodically saved to the persistent storage. Modern database systems load an entire database into volatile memory in order to provide improved processing performance. The database data is loaded from a persistent storage into memory on startup and saved periodically to the persistent storage during operation (e.g., at savepoints).

If a database crashes during operation, the last savepoint image is loaded into memory and logs are replayed in order to bring the in-memory database back to a state which existed just prior to the crash. Loading an entire savepoint image from persistent storage may consume an undesirable amount of time. For example, assuming 100 GB of data and a disk I/O of 100 MB/sec, loading will require almost 17 minutes.

Some database systems utilize memory which persists even after a database system crash. In order to avoid data inconsistencies, such systems may recover from a crash by checking whether the pages stored in this memory exactly match the pages of the last savepoint image. If so, database operation may proceed after restarting the database system using the pages in the memory, thereby eliminating the time required to load the savepoint image. However, if the in-memory pages differ in any way from the pages of the last savepoint image, the in-memory pages are discarded and the entire savepoint image must be loaded into the memory as described above.

Systems are desired to facilitate crash recovery in database systems using in-memory pages. Such systems may further guarantee consistency of the stored pages without requiring additional overhead during runtime. Such systems may also address unexpected corruption of the in-memory pages.

DETAILED DESCRIPTION

The following description is provided to enable any person in the art to make and use the described embodiments and sets forth the best mode contemplated for carrying out some embodiments. Various modifications, however, will be readily-apparent to those in the art.

Some embodiments improve database crash recovery by identifying in-memory pages which differ from pages of a persisted savepoint image. Then, only the identified pages are loaded from persistent storage into memory, eliminating a need to load all pages of the savepoint image into memory. Database recovery may therefore proceed much faster than in situations requiring loading of all pages of a savepoint image into memory.

According to some embodiments, identification of the pages includes verifying a data checksum stored in each page within the memory. This verification may serve to identify corrupted pages which would otherwise be determined as identical to corresponding pages of the savepoint image.

Some embodiments perform the foregoing using page header data which is otherwise used for various runtime processes and therefore exhibit limited impact on runtime overhead.

Figure 1A:
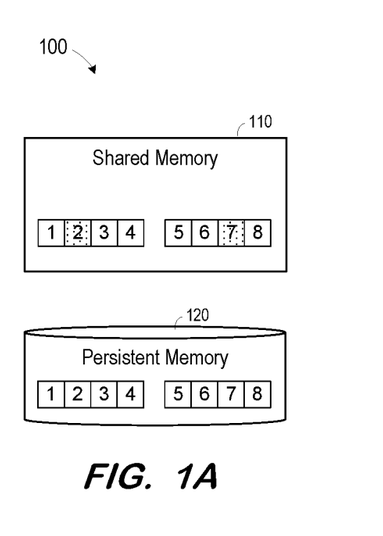
FIG. 1A illustrates a database system after a crash according to some embodiments.
Figure 1B:
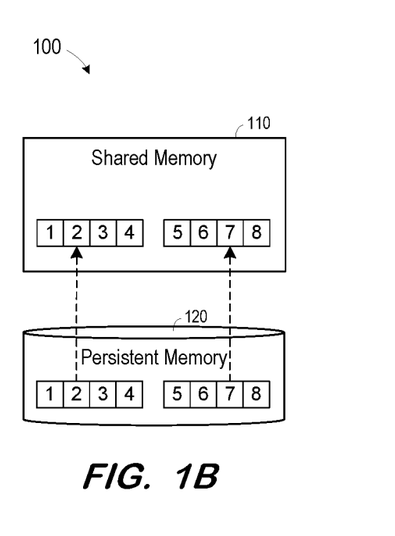
FIG. 1B illustrates loading of pages from a persisted savepoint image into shared memory after a crash according to some embodiments.

FIGS. 1A and 1B provide a simple illustration of operation according to some embodiments. Database system 100 includes shared memory 110 and persistent memory 120. Shared memory 110 comprises volatile memory of a computing system which, under certain conditions, maintains its stored data even after a database system crash. For example, as will be described in more detail below, a database server process and a holder process may execute within a computing system including shared memory 110, and shared memory 110 may maintain its stored data even after crashing of the database server process, as long as the holder process remains operational.

Although embodiments are described with respect to shared memory, some embodiments may utilize to other types of memory which persist after a crash. Examples of such memory include but are not limited to Non-Volatile RAM and tmpfs files.

Persistent memory 120 may comprise any system for persistent data storage that is or becomes known, including standalone and distributed storage systems. According to some examples, a persistent storage system maintains the integrity of stored data in the event of a power failure.

FIG. 1A shows pages 1 through 8 of a savepoint image stoerd in persistent memory 120. As is known in the art, the pages of a savepoint image are internally consistent and, taken together, represent a consistent state of database data. Shared memory 110 also includes pages 1 through 8 of the database data. However, as indicated by shading, pages 2 and 7 stored within shared memory 110 differ from pages 2 and 7 stored within persistent memory 120.

It will be assumed that FIG. 1A represents database system 100 after a crash. Shared memory 110 maintains its stored pages as described above and as known in the art. FIG. 1B illustrates a process according to some embodiments to recover and restart system 100 after such a crash.

In particular, embodiments may determine that pages 1, 3, 4, 5, 6 and 8 stored in shared memory 110 of FIG. 1A are identical to the corresponding data pages of the savepoint image of memory 120. Other embodiments may determine that pages 2 and 7 stored in shared memory 110 of FIG. 1A might not be identical to corresponding data pages 2 and 7 of the savepoint image of memory 120. In either case, and as illustrated in FIG. 1B, it is determined to replace pages 2 and 7 of shared memory 110 with 2 and 7 of the savepoint image of memory 120. Additional recovery steps such as log replay and uncommitted change handling may then be applied as is known in the art.

Figure 2:
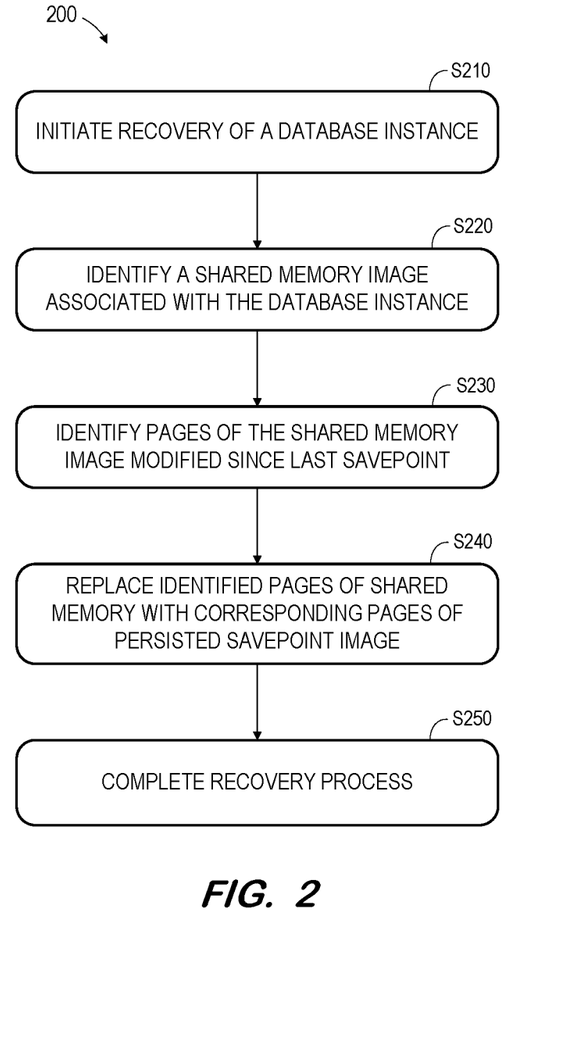
FIG. 2 is a flow diagram of a process to replace pages of a shared memory from a persisted savepoint image after a crash according to some embodiments.

FIG. 2 is a flow diagram of process 200 to replace pages of a shared memory from a persisted savepoint image after a crash according to some embodiments. In some embodiments, various hardware elements of a computing system execute program code to perform process 200. Process 200 and all other processes mentioned herein may be embodied in processor-executable program code read from one or more of non-transitory computer-readable media, such as a hard disk drive, a volatile or non-volatile random-access memory, a DVD-ROM, a Flash drive, and a magnetic tape, and executed by one or more processor, processor cores, processor threads or other processing units. In some embodiments, hard-wired circuitry may be used in place of, or in combination with, program code for implementation of processes according to some embodiments. Embodiments are not limited to any specific combination of hardware and software.

Process 200 may occur after a crash of a database instance. It will be assumed that the computing system executing the database instance includes shared memory which persists all pages of the database instance after the crash. Although the term "shared memory" is used, embodiments are not limited to memory which is shared by another process.

S210 includes initiation of a recovery process for a database instance. For example, a database administrator may instruct a computing system at S210 to recover and start a specified database instance.

A shared memory image associated with the database instance to be started is identified at S220. Identification of an associated shared memory image according to some embodiments will be described in detail below. Briefly, the shared memory may include an anchor block having a known location and associated with the shared memory image. The anchor block may include an identifier of the database instance which created it. Accordingly, S220 may include identification of an anchor block which includes an identifier of the instance to be started, and identification of shared memory blocks to which the anchor block points. The identified shared memory blocks include the shared memory image.

Next, at S230, pages of the shared memory image which have been modified since a last savepoint are identified. Any suitable mechanism for identifying such pages may be implemented at S230. To reduce demand on runtime resources, such a mechanism may utilize data structures which are otherwise used during runtime operation.

Figure 3:
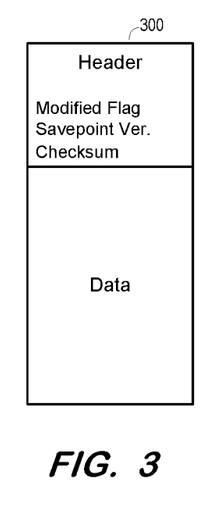
FIG. 3 is a representation of the elements of a database table page according to some embodiments.

FIG. 3 illustrates data page 300 according to some embodiments. Data page 300 includes a header and data. The data may comprise a portion of data of a database table. The header includes several fields and flags as is known in the art, which are not limited to those illustrated in FIG. 3.

A page such as page 300 may be stored in shared memory and may be updated during normal runtime operation of the database system. In order to update a page in shared memory according to some examples, an exclusive lock is acquired to prevent concurrent updates or initiation of a savepoint. If the modified flag is not set, it is set and the savepoint version is incremented. The data of the page is them modified and the lock is released.

At a next savepoint, each data page having a set modified flag is identified. The identified pages are those which have been modified since a last savepoint. Then, for each identified page, an exclusive lock is acquired and a page snapshot is generated and stored in the persisted savepoint image of the savepoint. The modified flag is reset and a checksum is calculated based on the page data and is stored in the header.

Based on the above-described runtime operation, the pages of shared memory which have been modified since a last savepoint may be identified at S230 by identifying those pages in which the modified flag is set. S230 may also include identifying pages having a header-stored savepoint version number which is equal to or less than the version of the persisted savepoint image being used for recovery. Additionally, in order to avoid reusing corrupted data pages of the shared memory image, S230 may also require the data of each identified page to be consistent with its respective header-stored checksum.

At S240, the identified pages of the shared memory are replaced with corresponding paged of the persisted savepoint image. In this regard, each page may be associated with a page identifier and S240 may comprise replacing each identified page of the shared memory with a page of the persisted savepoint image which is associated with the same page identifier. Such replacement may consume significantly less time, even including steps S220 and S230, than loading the entire persisted savepoint image into shared memory. Considering that the shared memory includes pages of a consistent savepoint image after completion of S240, flow then proceeds to S250 to complete the recovery process and begin normal runtime operation as is known in the art.

Figure 4A:
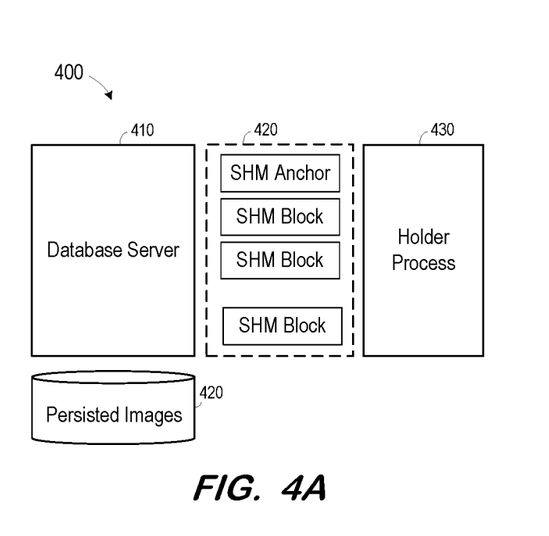
FIG. 4A illustrates a database system during operation in conjunction with a shared memory and a holder process according to some embodiments.

FIG. 4A illustrates database system 400 during runtime operation according to some embodiments. Database server 410 may comprise a query processor to serve queries on the data and engines for processing data. Shared memory 420 is managed by the same computing platform operating system on which database server 410 executes, and holder process 430 executes on the same operating system.

According to some embodiments, a segment of shared memory 420 is not destroyed even if database server 410 crashes as long as another process (e.g., holder process 430) references (i.e., is attached to) the segment and is still running. This implementation avoids the need for clean-up of shared memory segments after database server 410 crashes. However, to be reused as described below, the segments should be kept in shared memory 420 until database server 410 restarts.

The segments of shared memory 420 include an anchor and blocks. The operating system knows the location of the anchor, which stores metadata relating to each shared memory block. Upon creation of the shared memory anchor, database server 410 stores instance identification information reflecting the particular instance of database server 410 and of the database in the shared memory anchor. A creation timestamp may also be stored in both the shared memory anchor and a configuration page of the database.

Database server 410 is able to create a new block of shared memory 420 when needed for page storage. Database server 410 updates the shared memory anchor with metadata of the new block of shared memory 420, which may include an operating system shared memory ID, a logical block ID, and a logical version number. The logical block ID and logical version number are also stored in the headers of all the pages in the block. A block of shared memory 420 may also be deleted if empty, resulting in deletion of the associated metadata within the shared memory anchor.

Holder process 430 is also attached to the shared memory anchor. Holder process 430 periodically scans the metadata of the shared memory anchor and attaches to any blocks of shared memory 420 identified in the metadata and to which holder process 430 is not yet attached. Similarly, holder process 430 may detach from any blocks of shared memory 420 which are no longer identified in the metadata of the shared memory anchor due to deletion by database server 410. In view of the foregoing, if database server 410 creates a new block and then crashes before holder process 430 attaches itself to the new block, the operating system will destroy the new block and the pages of the new block will have to be loaded from persisted images 420 on restart.

Figure 4B:
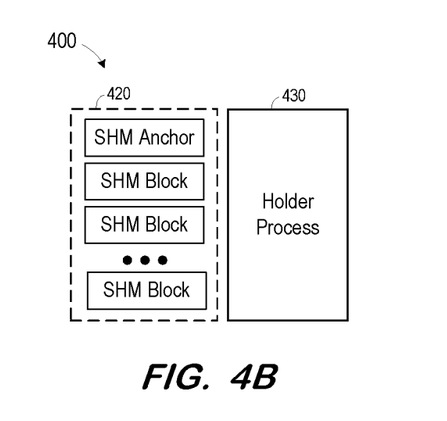
FIG. 4B illustrates the shared memory and the holder process of FIG. 4A after a crash according to some embodiments.

FIG. 4B illustrates shared memory 420 and holder process 430 after a crash of database server 410 according to some embodiments. The segments of shared memory to which holder process 430 is attached are present even after the crash and may be used on startup as described herein.

In some embodiments, created shared memory segments are maintained in memory regardless of the number of processes attached thereto, until an explicit system call is issued to destroy the segments. Such embodiments may exhibit a need to cleanup garbage segments after a database server crash.

Figure 5:
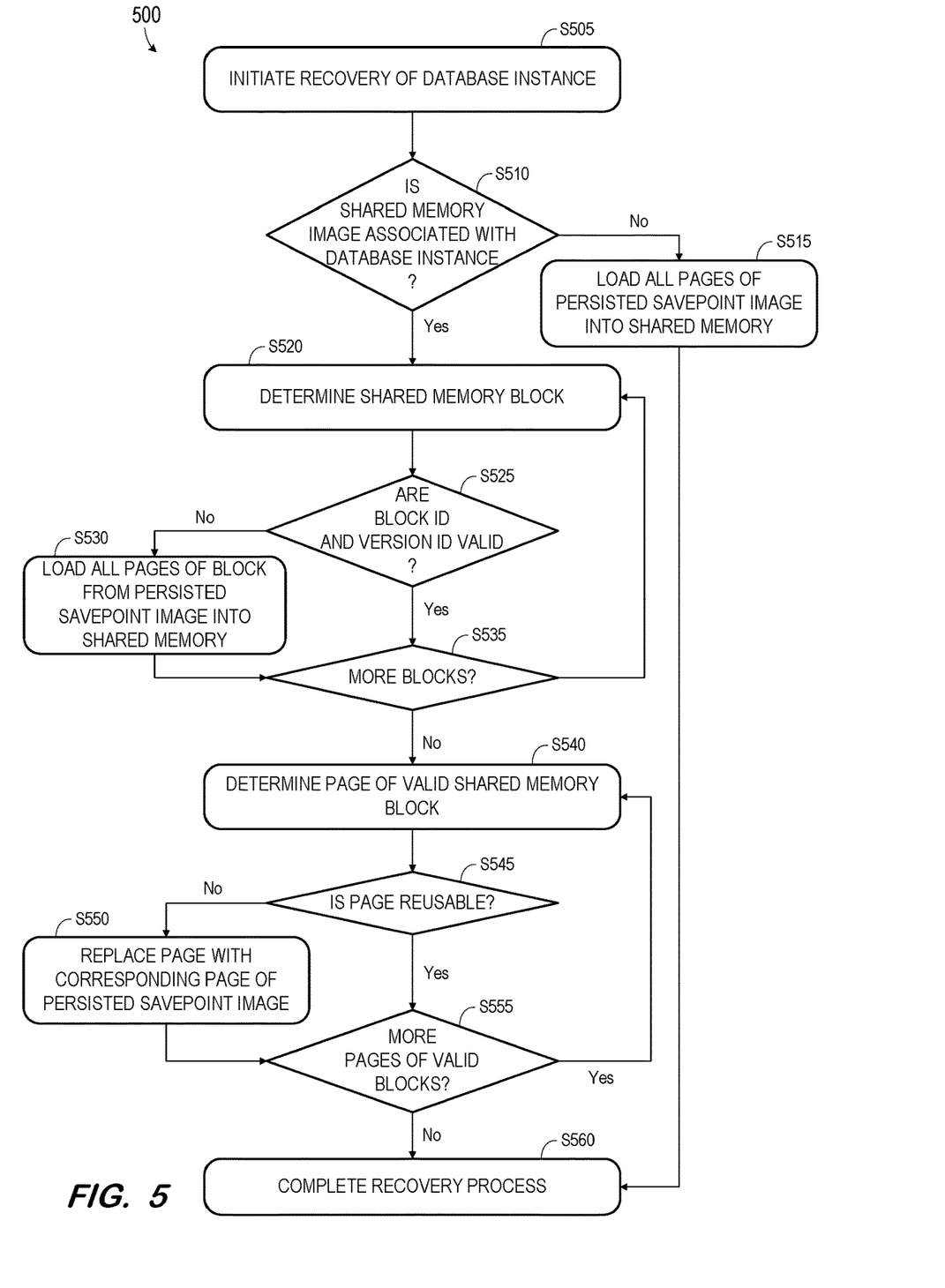
FIG. 5 is a flow diagram of a process to recover from a crash by identifying and replacing particular pages of a shared memory from a persisted savepoint image according to some embodiments according to some embodiments.

FIG. 5 is a flow diagram of process 500 according to some embodiments.

Process 500 may comprise a specific implementation of process 200, but embodiments are not limited thereto. Process 500 assumes that a database server has crashed, a corresponding savepoint image is present in persisted memory and an anchor and blocks located are present in shared memory.

Recovery of a database instance is initiated at S505. The database instance comprises a database server and a specific database of data. At S510, it is determined whether the shared memory image is associated with the database instance. The determination at S510 may comprise locating the anchor block in shared memory and determining whether the instance identifier and creation timestamp of the anchor block match an identifier of the instance to be recovered and the creation timestamp of the instance as stored in the above-described data page.

S510 may identify an attempt to restore a savepoint image which is different from the one corresponding to the segments of the shared memory (e.g., hot standby). Accordingly, if the determination at S510 is positive, flow proceeds to S515 to load all pages of the persisted savepoint image into shared memory. The recovery process is then competed at S560 based on the loaded pages.

If it is determined at S510 that the shared memory image is associated with the database instance, flow continues to S520 to acquire determine a shared memory block. S520 may include identification of a shared memory block defined in the metadata of the anchor block.

At S525, it is determined whether the block ID and the version ID of the determined block are valid. For example, at runtime, a shared memory block with block ID 5 is deallocated and then a new shared memory block is allocated with ID 5. Creation of the new block updates the version number associated with block ID 5 in the shared memory anchor. A holder process is attached to the original shared memory block with ID 5 and a crash occurs before the holder process detaches therefrom and attaches to the new shared memory block with ID 5. S525 detects invalidity of the original shared memory block with ID which remains after the crash by comparing its version number with the version number of block ID 5 now saved in the shared memory anchor.

If the block ID and version ID are not valid, all pages of the block are loaded from the persisted savepoint image into the shared memory. The both IDs are valid, flow proceeds from S525 to S535. At S535, it is determined whether more blocks are identified in the shared memory anchor. If so, flow returns to S525 and repeats as described above. Flow proceeds from S535 to S540 once all blocks have been considered at S525. At this point, pages of all invalid blocks have been loaded from the persisted savepoint image into shared memory and the remaining blocks of the shared memory are considered valid.

At S540, a page of a valid shared memory block is determined. S545 then comprises a determination of whether the determined page is resusable. S545 may comprise a determination of whether the modified flag of the page header is set, the savepoint version number of the page is equal to or less than the version of the persisted savepoint image being used for recovery, and the data of the page is consistent with its checksum. The page may be deemed reusable if all three conditions are true. If so, the page is left undisturbed in shared memory and flow proceeds to S555 to determine whether any more pages of valid blocks remain to be considered at S545. If so, flow returns to S540 to determine a next page of one of the valid shared memory blocks.

If it is determined at S545 that the page is not reusable, the page is replaced in shared memory with a corresponding page of the savepoint image at S550. Flow then proceeds to S555 and continues as described above. Once all pages of valid blocks have been considered, the shared memory includes a copy of the persisted savepoint image and flow proceeds to S560 to complete the recovery process.

Notably, the determinations of processes 200 and 500 may proceed without any persisted storage I/O. The only prerequisite information are the version of the subject savepoint image and the pages within the image.

Figure 6:
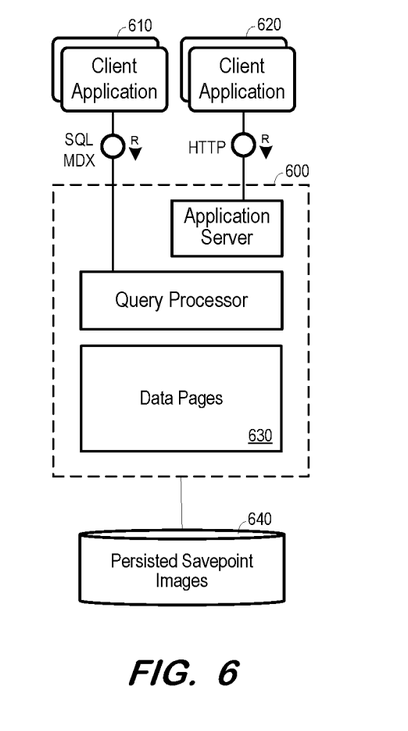
FIG. 6 is a block diagram of a database system according to some embodiments.

FIG. 6 illustrates database server 600, which may or may not comprise a node in a distributed database system including multiple server nodes. Generally, server 600 may receive a query from client applications 610 or 620 and return results thereto based on data stored within data pages of shared memory 630. Persistent storage 640 stores savepoint images of the data pages of shared memory 630.

Server 600 and/or storage 640 may be cloud-based and components thereof may be implemented using on-demand virtual machines, virtual servers and cloud storage instances. Such cloud-based components may be connected to the Internet and/or to any network or combinations of networks. A cloud can include a wide area network (WAN) such as the public Internet or a private network, and may include a local area network (LAN) within an organization.

Server 600 executes program code to provide an application server and a query processor. The application server provides services for executing server applications. For example, Web applications executing on an application server may receive HyperText Transfer Protocol (HTTP) requests from client applications 620 as shown.

The query processor processes Structured Query Language (SQL) and Multi-Dimensional eXpression (MDX) statements and may the latter statements directly from client applications 610. The query processor may also include a query optimizer and plan generator for use in determining query execution plans.

Server 600 may include many additional software components providing functionality that is or becomes known. For example, server 600 may include components to perform administrative and management functions. Such functions may include savepoint and backup management, crash recovery, indexing, optimization, garbage collection, and/or any other database functions that are or become known. Server 600 may support multi-tenancy to separately support multiple unrelated clients by providing multiple logical database systems which are programmatically isolated from one another.

Figure 7:
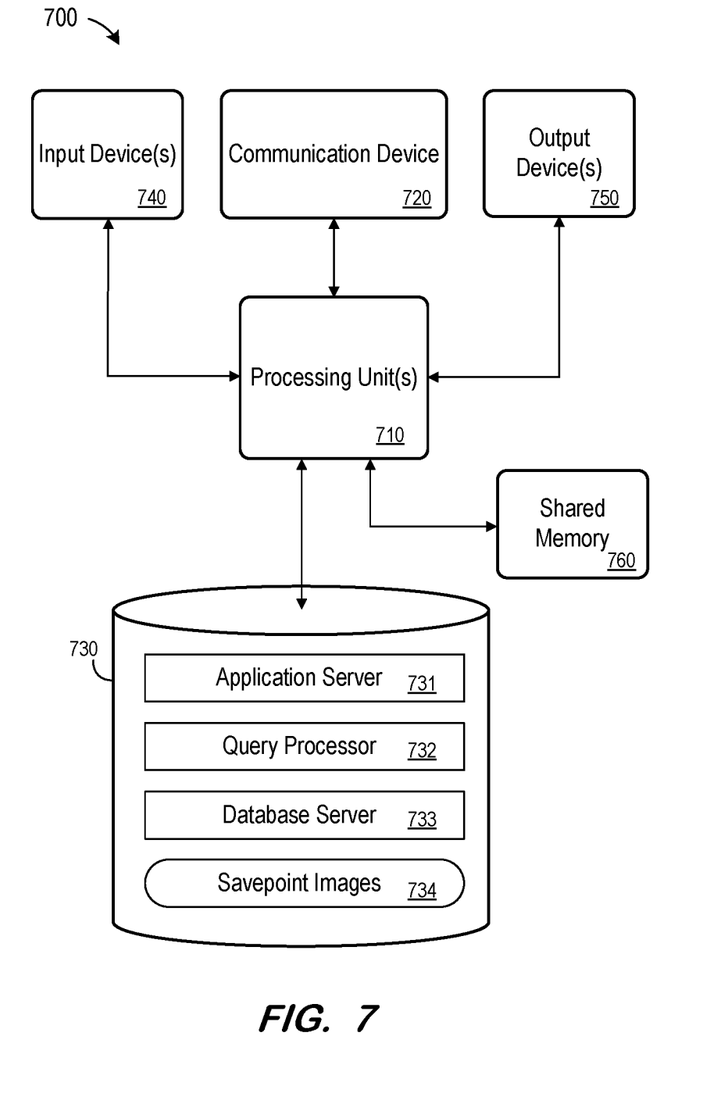
FIG. 7 is a block diagram of a computing system according to some embodiments.

FIG. 7 is a block diagram of server node 700 according to some embodiments. Server node 700 may comprise a general-purpose computing apparatus and may execute program code to perform any of the functions described herein. Server node 700 may comprise an implementation of server node 600 in some embodiments. Server node 700 may include other unshown elements according to some embodiments.

Server node 700 includes processing unit(s) 710 operatively coupled to communication device 720, data storage device 730, one or more input devices 740, one or more output devices 750 and shared memory 760. Communication device 720 may facilitate communication with external devices, such as a client device or a data storage device. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into apparatus 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while shared memory 760 may comprise Random Access Memory (RAM).

Application server 731, query processor 732 and database server 733 may each comprise program code executed by processing unit(s) 710 to cause server 700 to perform any one or more of the processes described herein. Embodiments are not limited to execution of these processes by a single computing device.

Savepoint images 734 may include pages of database data as described above. As also described above, such database data may be stored in volatile memory during runtime such as shared memory 760. Data storage device 730 may also store data and other program code for providing additional functionality and/or which are necessary for operation of server 700, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
a random access memory storing a memory image of pages of a database instance;
a persistent storage system storing a savepoint image of the pages of the database instance; and
a processing unit to execute processor-executable program code in order to cause the system to:
initiate recovery from a crash of the database instance;
during the recovery, identify a plurality of pages of the memory image associated with a set modified header flag and a savepoint version which is equal to or less than a savepoint version of the savepoint image as not reusable; and
during the recovery, replace the identified plurality of pages with corresponding pages of the savepoint image.

2. A system according to claim 1, wherein identification of the plurality of pages of the memory image which are not reusable comprises:
identification of pages associated with a checksum that conforms to data stored by the pages having the set modified header flag and the savepoint version that is equal to or less than a savepoint version of the savepoint image.

3. A system according to claim 1, wherein identification of a plurality of pages of the memory image which are not reusable comprises:
during the recovery, determination that a first block of the memory image is invalid, and, in response to the determination that the first block of the memory image is invalid, identification of all pages of the first block as not reusable.

4. A system according to claim 3, wherein identification of a plurality of pages of the memory image which are not reusable comprises:
during the recovery, determination that a second block of the memory image is invalid and, in response to the determination that the second block of the memory image is invalid, identification of pages of the second block which are associated with a set modified header flag and a savepoint version which is equal to or less than a savepoint version of the savepoint image.

5. A system according to claim 4, wherein determination of whether a block of the memory is invalid comprises:
determination of a block ID identifier and a version ID identifier associated with the block in a memory anchor segment; and
comparison of the determined block ID identifier and version ID identifier with a block ID identifier and a version ID identifier stored in the block of the memory.

6. A system according to claim 5, wherein identification of the plurality of pages of the memory image that are not reusable comprises:
identification of pages associated with a checksum that conforms to data stored by the pages having the set modified header flag and the savepoint version that is equal to or less than a savepoint version of the savepoint image.

7. A computer-implemented method, comprising:
storing a memory image of pages of a database instance in a random access memory;
storing a savepoint image of the pages of the database instance in a persistent storage system;
initiating recovery from a crash of the database instance;
during the recovery, identifying a subset of pages of the memory image associated with a set modified header flag and a savepoint version which is equal to or less than a savepoint version of the savepoint image as not reusable; and
during the recovery, replacing the subset of pages with corresponding pages of the savepoint image.

8. A computer-implemented method according to claim 7, wherein identifying the subset of pages of the memory image which are not reusable comprises:
identifying pages associated with a checksum that conforms to data stored by the pages having the set modified header flag and the savepoint version that is equal to or less
than a savepoint version of the savepoint image.

9. A computer-implemented method according to claim 7, wherein identifying the subset of pages of the memory image which are not reusable comprises:
during the recovery, determining that a first block of the memory image is invalid, and, in response to the determination that the first block of the memory image is invalid, identifying all pages of the first block as not reusable.

10. A computer-implemented method according to claim 9, wherein identifying the subset of pages of the memory image which are not reusable comprises:
during the recovery, determining that a second block of the memory image is invalid and, in response to the determination that the second block of the memory image is invalid, identifying pages of the second block which are associated with a set modified header flag and a savepoint version which is equal to or less than a savepoint version of the savepoint image.

11. A computer-implemented method according to claim 10, wherein determining whether a block of the memory is invalid comprises:
determining a block ID identifier and a version ID identifier associated with the block in a memory anchor segment; and
comparing the determined block ID a identifier nd version ID identifier with a block ID identifier and a version ID identifier stored in the block of the memory.

12. A computer-implemented method according to claim 11, wherein identifying the subset of pages of the memory image which are not reusable comprises:
identifying pages associated with a checksum which that conforms to the data stored by the page pages having the set modified header flag and the savepoint version that is equal to or less than a savepoint version of the savepoint image.

13. A system comprising:
a database server storing a memory image of pages of a database instance; and
a persistent data storage system storing a savepoint image of pages of the database instance,
wherein the database server is to:
initiate recovery from a crash of the database instance;
during the recovery, identify a subset of pages of the memory image of the database instance associated with a set modified header flag and a savepoint version which is equal to or less than a savepoint version of the savepoint image as not reusable; and
during the recovery, replace the identified subset of pages with corresponding pages of the savepoint image.

14. A system according to claim 13, wherein identification of the subset of pages of the memory image which are not reusable comprises:
identification of pages associated with a checksum that conforms to data stored by the pages having the set modified header flag and the savepoint version that is equal to or less than a savepoint version of the savepoint image.

15. A system according to claim 13, wherein identification of the subset of pages of the memory image which are not reusable comprises:
during the recovery, determination that a first block of the memory image is invalid, and, in response to the determination that the first block of the memory image is invalid, identification of all pages of the first block as not reusable.

16. A system according to claim 15, wherein identification of the subset of pages of the memory image which are not reusable comprises:
during the recovery, determination that a second block of the memory image is invalid and, in response to the determination that the second block of the memory image is invalid, identification of pages of the second block which are associated with a set modified header flag and a savepoint version which is equal to or less than a savepoint version of the savepoint image.

17. A system according to claim 16, wherein determination of whether a block of the memory is invalid comprises:
determination of a block ID identifier and a version ID identifier associated with the block in a memory anchor segment; and
comparison of the determined block ID identifier and version ID identifier with a block identifier ID and a version ID identifier stored in the block of the memory.

* * * * *